United States Patent
Cao et al.

(10) Patent No.: US 10,466,382 B2
(45) Date of Patent: Nov. 5, 2019

(54) DUAL-MODE RAPIDLY-PASSING TYPE MOVING TARGET RADIATION INSPECTION SYSTEM AND METHOD

(71) Applicant: Powerscan Company Limited, Beijing (CN)

(72) Inventors: Yanfeng Cao, Beijing (CN); Shaofeng Wang, Beijing (CN); Xiong Yan, Beijing (CN); Jianbin Zheng, Beijing (CN); Dan Zhang, Beijing (CN); Suqi Li, Beijing (CN); Zhitao Feng, Beijing (CN)

(73) Assignee: Powerscan Company Limited (CN)

( * ) Notice: Subject to any disclaimer, the term of this patent is extended or adjusted under 35 U.S.C. 154(b) by 358 days.

(21) Appl. No.: 15/126,837

(22) PCT Filed: Sep. 1, 2014

(86) PCT No.: PCT/CN2014/085672
§ 371 (c)(1),
(2) Date: Sep. 16, 2016

(87) PCT Pub. No.: WO2015/172464
PCT Pub. Date: Nov. 19, 2015

(65) Prior Publication Data
US 2017/0090062 A1  Mar. 30, 2017

(30) Foreign Application Priority Data

May 15, 2014 (CN) .......................... 2014 1 0204799

(51) Int. Cl.
*G01N 23/04* (2018.01)
*G01V 5/00* (2006.01)
(52) U.S. Cl.
CPC .......... *G01V 5/0041* (2013.01); *G01V 5/0016* (2013.01)

(58) Field of Classification Search
CPC .. G01V 5/0016; G01V 5/0041; G01V 5/0066; G01V 5/005; G01V 5/0008;
(Continued)

(56) References Cited

U.S. PATENT DOCUMENTS 7,310,409 B2 * 12/2007 Tanaka .................... H05G 2/00
378/137
9,772,427 B2 * 9/2017 Kang .................... G01V 5/0025
(Continued)

FOREIGN PATENT DOCUMENTS

CN  101162507 A  4/2008
CN  203178215 U  9/2013
(Continued)

OTHER PUBLICATIONS

International Search Report for Application No. PCT/CN2014/085672 dated Feb. 6, 2015.

*Primary Examiner* — Irakli Kiknadze
(74) *Attorney, Agent, or Firm* — Lerner, David, Littenberg, Krumholz & Mentlik, LLP

(57) ABSTRACT

A dual-mode rapidly-passing type moving target radiation inspection system comprises a radiation source, a collimator, sensor units, a control module, a radiation detector and a radiation imaging device, wherein the sensor units are used for identifying the type of a moving target and monitoring the position of the moving target in an inspection channel; the control module is used for controlling the radiation source to emit rays in a preset working mode on the basis of the type and the position of the moving target; the preset working mode corresponds to the type of the moving target, and the rays emitted by the radiation source in different working modes differ in dosage rate. Also disclosed is a dual-mode rapidly-passing type moving target radiation inspection method. The inspection system and method
(Continued)

described above are capable of radiation inspection of the entire moving targets such as vehicles.

14 Claims, 5 Drawing Sheets

(58) Field of Classification Search
CPC ...... G01V 5/0033; G01V 5/00; G01V 5/0069;
G01V 5/0091; G01V 5/0025; G01N
23/04; G01N 23/083; G01N 2223/639;
G01N 23/046; G01N 23/02; G01N
2223/419; G01N 2223/423; G01N
2223/629; G01N 2223/66; G01N 23/207;
G01N 2033/0081; G01N 2223/402; G01N
2223/626; G01N 23/087; G01N
23/20091; H01J 35/02; H01J 2235/08;
G01P 3/36; G01P 3/68; G01S 17/42;
G01S 17/58; G01S 17/88; A61B 6/032;
A61B 6/035; A61B 6/06; G21K 1/02;
G21K 1/04; G21K 2207/00; G21K 1/093;
H05G 1/02; H05G 2/00; H05H 11/04;
H05H 13/10; H05H 7/12; H05H 11/00;
H05H 6/00; H01L 2224/48091; H01L
2924/00014; H01L 2224/45144; H01L
2224/05554; H01L 2224/49175; H01L
25/18; H01L 2924/00; H01L 24/97; H01L
2924/01029; H01L 2924/12041; H01L
33/486; H01L 33/58; H01L 33/60; H01L
33/62

USPC .......................................... 378/57, 62–64, 70
See application file for complete search history.

(56) References Cited

U.S. PATENT DOCUMENTS

| | | | | |
|---|---|---|---|---|
| 2009/0268872 | A1* | 10/2009 | Bermuth | H05G 2/00 378/121 |
| 2009/0316136 | A1* | 12/2009 | Chen | G01B 11/24 356/28 |
| 2010/0195791 | A1* | 8/2010 | Ishkhanov | H05H 7/12 378/57 |
| 2011/0038453 | A1 | 2/2011 | Morton et al. | |
| 2012/0294423 | A1* | 11/2012 | Cheung | H05H 7/02 378/65 |
| 2013/0039462 | A1 | 2/2013 | Morton | |
| 2013/0136230 | A1* | 5/2013 | Arodzero | G01V 5/0016 378/57 |
| 2014/0348295 | A1 | 11/2014 | Jeck et al. | |

FOREIGN PATENT DOCUMENTS

| | | | |
|---|---|---|---|
| CN | 103984035 A | 8/2014 | |
| CN | 204009098 U | 12/2014 | |
| EP | 3040742 A1 * | 7/2016 | ............ H05G 1/46 |
| WO | 2012106730 A2 | 8/2012 | |
| WO | 2013117694 A2 | 8/2013 | |

* cited by examiner

DUAL-MODE RAPIDLY-PASSING TYPE MOVING TARGET RADIATION INSPECTION SYSTEM AND METHOD

CROSS REFERENCE TO RELATED APPLICATIONS

The present application is a national phase entry under 35 U.S.C. § 371 of International Application No. PCT/CN2014/085672, filed Sep. 1, 2014, which claims priority from Chinese Patent Application No. 201410204799.6 filed May 15, 2014, all of which are hereby incorporated herein by reference.

TECHNICAL FIELD

The present invention relates to a technical field of radiation imaging, and specifically to dual-mode rapidly-passing type moving object radiation inspection system and method.

BACKGROUND OF THE INVENTION

A high energy radiation system generally has a radiation source, a collimator for collimating the rays emitted from the radiation source into a sector-shape beam, a sensor for detecting the position of a moving object, a radiation detector, a radiation imaging device, a radiation shielding apparatus, etc. Such type of high energy radiation system is utilized to automatically scan an object moving with high speed, such as a vehicle, for inspection, and can accomplish a security check for smuggling, illegal and prohibited objects without interrupting the passing of the vehicles with high speed, and is an ideal means used to implement a security check to vehicles and cargoes.

During radiation inspection on vehicles moving with high speed, it is necessary to avoid radiating and scanning the portion of the vehicle containing persons. Generally, the radiation source emits rays after the driving cab passes the scanning position, and the rays scan only the cargo carriage behind the driving cab, rather than scanning the driving cab, thereby ensuring that the driver can be protected from radiation damage. As a result, the radiation system however cannot scan the vehicle driving cab (such as the vehicle head of a cargo truck) and completely cancels the scanning for some passenger carrying vehicles (such as a bus with a high density of passengers therein). Therefore, an inspection on the whole vehicle may not be performed, causing a potential security risk.

SUMMARY OF THE INVENTION

In view of this, in the embodiment(s) of the present invention, dual-mode rapidly-passing type moving object radiation inspection system and method are provided. With respect to different types of moving objects or to different portions of the same moving object, different radiation scanning working modes are used, thereby enabling inspection on the whole vehicle with the safety of the person(s) being ensured.

In the embodiment(s) of the present invention, a dual-mode rapidly-passing type moving object radiation inspection system is provided, comprising: a radiation source, a collimator, a sensor unit, a control module, a radiation detector and a radiation imaging device, wherein the sensor unit is used for identifying a type of a moving object and monitoring a position of the moving object in an inspection passage; the control module is used for controlling the radiation source to emit rays in a preset working mode, based on the type and the position of the moving object; wherein, the preset working mode corresponds to the type of the moving object, and the rays emitted from the radiation source in different working modes differ in dose rate.

Preferably, the preset working mode comprises a constant dose rate mode and a non-constant dose rate mode; in the constant dose rate mode, the dose rate of the rays is kept as a low dose rate; while in the non-constant dose rate mode, the dose rate of the rays is switched between a low dose rate and a high dose rate; wherein the low dose rate is lower than a limit specified in the radiation safety regulations while the high dose rate is higher than the limit specified in the radiation safety regulations.

Preferably, the average electron flux intensity concerned when the radiation source emits rays in low dose rate is 1~20% of that concerned when the radiation source emits rays in high dose rate.

Preferably, the radiation source is used for emitting mono-energy rays and/or dual-energy rays.

Preferably, the sensor unit comprises a first sensor sub-unit, a second sensor sub-unit and a third sensor sub-unit; the first sensor sub-unit is located on an upstream side of a radiation inspection region in the inspection passage while the second and third sensor sub-units are located on a downstream side of the radiation inspection region; a distance between the second and third sensor sub-units is larger than or equal to L, wherein L is a maximum length of a space for containing persons among various types of moving objects.

Preferably, the radiation detector is a 2D array detector, comprising a plurality of 1D array detectors which are arranged to be closely adjacent to one another.

Preferably, the collimator has a plurality of narrow slots which are arranged such that the rays passing through the collimator cover the radiation detector.

In the embodiment(s) of the present invention, a dual-mode rapidly-passing type moving object radiation inspection method based on the above system(s) is further provided, and it comprises: regarding the moving object having a driving cab and a cargo carriage, when the driving cab is to enter the inspection region, performing scanning with rays in low dose rate; when the driving cab leaves the inspection region and the cargo carriage is to enter the inspection region, performing scanning with rays in high dose rate; and after the moving object completely leaves the inspection region, stopping scanning.

Preferably, during a single radiation inspection, the rays in low dose rate are mono-energy rays or dual-energy rays, and the rays in high dose rate are mono-energy rays or dual-energy rays.

Preferably, when the rays in low dose rate are the mono-energy rays, the radiation energy of the rays is 1~9 Mev; and when the rays in low dose rate are the dual-energy rays, the high and low energy states of the rays are selected from one of the following three items: ① a low energy of 1~6 MeV and a high energy of 4~9 MeV; ② a low energy of 1~3 MeV and a high energy of 2~5 MeV; ③ a low energy of 3~6 MeV and a high energy of 4~9 MeV; wherein the high energy of the dual-energy rays is always higher than the low energy thereof.

Preferably, when the rays in high dose rate are the mono-energy rays, the radiation energy of the rays is 4~9 Mev; and when the rays in high dose rate are the dual-energy rays, the high and low energy states of the rays are selected from one of the following two items: ① a low energy of 1~6

MeV and a high energy of 4~9 MeV; ②a low energy of 3~6 MeV and a high energy of 4~9 MeV; wherein the high energy of the dual-energy rays is always higher than the low energy thereof.

Preferably, when both the rays in low dose rate and the rays in high dose rate are the dual-energy rays, there are at least three energy states during a single radiation inspection.

In the embodiment(s) of the present invention, a dual-mode rapidly-passing type moving object radiation inspection method based on the above system(s) is further provided, and it comprises: regarding the moving object having all its cab/carriage(s) for containing persons, when the moving object is to enter the inspection region, performing scanning with rays in low dose rate; after the moving object completely leaves the inspection region, stopping scanning.

Preferably, during a single radiation inspection, the rays in low dose rate are mono-energy rays or dual-energy rays.

Preferably, when the rays in low dose rate are the mono-energy rays, the radiation energy thereof is 1~9 Mev; and when the rays in low dose rate are the dual-energy rays, the high and low energy states of the rays are selected from one of the following two items: ① a low energy of 1~6 MeV and a high energy of 4~9 MeV; ② a low energy of 1~3 MeV and a high energy of 2~5 MeV; wherein the high energy of the dual-energy rays is always higher than the low energy thereof.

The beneficial effects of the present invention: in the embodiment(s) of the present invention, based on the type of the scanned object, the radiation scanning working mode of the radiation source is determined, and different working modes are used for different types of moving objects; the radiation inspection is 100% performed on the moving object; when the cargo is under high energy radiation scanning in high dose rate, a person is ensured to receive a radiation dose each time lower than the limit specified in the safety regulations; and the material identification can be performed in the dual-energy scanning mode. With the embodiment(s) of the present invention, the radiation scanning inspection which is stable, reliable, fast-responsive, and high in safety can be achieved, and is an optimum manner for automatic fast scanning inspection on different types of moving objects.

DESCRIPTION OF EXEMPLARY EMBODIMENTS

Hereinafter, the technical solution(s) of the present invention will be described in detail in connection with specific embodiments and with reference to the accompanying drawings.

In describing the radiation amount of X rays or y rays to an object, parameters related to the radiation dose and the radiation dose rate may be used. For example, the absorbed dose means the average energy of the radiation accepted or "absorbed" by unit/specific mass of material, in J/kg or in an international unit of Gray (Gy), wherein 1 J/kg=1 Gy. The radiation dose rate is the radiation dose within unit time. By decreasing the radiation dose (hereinafter the "dose" for short) or the radiation dose rate (hereinafter the "dose rate" for short) of the rays, the physiological damage by the radiation to the human body can be reduced.

Figure 1:
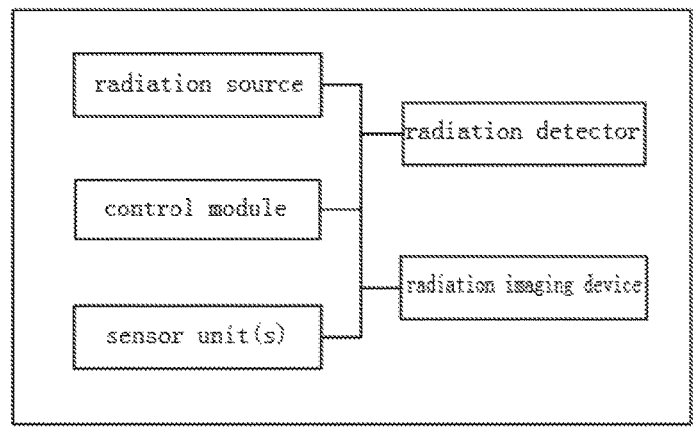
FIG. 1 is a structural diagram of a radiation inspection system according to an embodiment of the present invention.

FIG. 1 shows a structural diagram of a radiation inspection system according to an embodiment of the present invention, comprising: a radiation source, sensor units, a control module, a radiation detector and a radiation imaging device, wherein the radiation source can emit rays in different dose rates which are collimated by a collimator into a sector-shape beam of radiation rays, irradiating a scanning region in an inspection passage. The sensor units can identify the type of the moving object and monitor the position of the moving object in the inspection passage. The control module can control the radiation source to emit rays in a preset working mode. The moving object is scanned when passing the scanning region. The beam of rays passes through the moving object, then is received by the radiation detector, and is used to form a radiation image by the radiation imaging device. Herein, the preset working mode of the radiation source includes at least two working modes. The rays in different working modes differ in dose rate. Different working modes are activated based on the type of the moving object. The radiation inspection is performed on the whole moving object.

Figure 2:
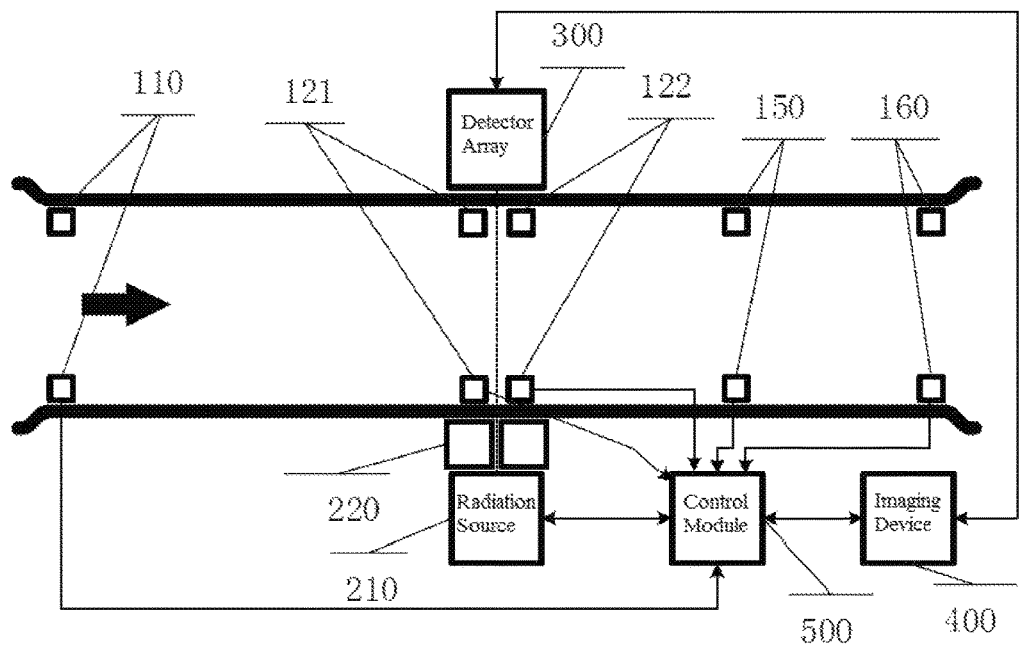
FIG. 2 is a schematic use case diagram of a radiation inspection system according to an embodiment of the present invention.

FIG. 2 shows a schematic use state diagram of a radiation inspection system according to an embodiment of the present invention, comprising: a radiation source 210, a collimator 220, sensor units (110, 121, 122, 150, 160), a detector array 300, a control module 500, and an imaging device 400, wherein the radiation source 210 emits, for example, X rays which are collimated by the collimator 220 into a sector-shape beam of radiation scanning rays that irradiates a scanning region. The moving object is scanned when passing the scanning region. The beam of rays passes through the moving object, then is received by the detector array 300, and is used to form a radiation image by the imaging device 400. The sensor units (110, 121, 122, 150, 160) cooperate with the control module 500, in controlling the working mode of the radiation source 210 as well as the time for starting and stopping emitting the rays.

Specifically, the sensor units (110, 121, 122, 150, 160) detect whether the moving object arrives (when it reaches the position where the sensor unit is located, the sensor unit is triggered) and detect whether the moving object leaves (when it leaves the position where the sensor unit is located, the sensor unit returns to its un-triggered state). The sensor units (110, 121, 122, 150, 160) may be a photoelectric sensor (such as a photoelectric switch, a light screen switch), a metal sensor (such as a ground sensing coil), a pressure sensor (such as an axle load sensor), etc., or may be a combination of these sensors. The sensor units (110, 121, 122, 150, 160) may be arranged above the ground of the passage, or may be arranged below the ground of the passage, for identifying different types of moving objects (such as a cargo truck having a relatively large profile dimension or a car having a relatively small profile dimension) and different portions of the moving object (such as the driving cab and the cargo carriage of the cargo vehicle). Different types of sensors may be used for detecting the parameters of the object, such as the moving speed, the displacement or the weight, etc. Based on the practical situation, a visual sensor may be used, for fast identifying the type, or the displacement, etc., of the vehicle.

In the embodiment of FIG. 2, the sensor unit 110 is arranged at an inlet of the inspection passage, for detecting whether any moving object enters the inspection passage. The sensor unit 160 is arranged at an outlet of the inspection passage, for detecting whether the moving object leaves the inspection passage. At the inlet and the outlet of the inspection passage, a traffic light and a bar may be further arranged, for guiding the moving object to enter the inspection passage at an appropriate time point, and preventing persons from radiation damage due to entering the passage by accident. In some embodiment(s), the sensor units 110 and 160 are not necessary.

The sensor unit 121 is arranged on the upstream side of the scanning region, and near a boundary of the scanning region on this side. If the sensor unit 121 is triggered, it means that a moving object is to enter the scanning region. The control module 500, based on the signal indicating that the sensor unit 121 is triggered, controls the ray source 210 to emit rays, thus starting scanning the moving object. The working mode in which the ray source 210 emits the rays will be described in detail hereinafter.

The sensor unit 122 is arranged on the downstream side of the scanning region, and near a boundary of the scanning region on this side. If the sensor unit 122 returns to its un-triggered state, it means that the moving object leaves the scanning region. The control module 500, based on the signal from the sensor unit 122, controls the ray source 210 to immediately stop emitting rays.

The sensor unit 150 is arranged on the downstream side of the scanning region, spaced apart from the boundary of the scanning region on this side by a certain distance which should be larger than or equal to a maximum length of a space for containing persons (such as the driving cab) among various types of moving objects such that when the sensor unit 150 is triggered, the driving cab portion in the moving object has passed through the scanning region while the remaining portions have not passed through the scanning region. The sensor unit 150 may comprise a plurality of photoelectric switches or light screens installed at positions in different heights to facilitate identifying different types of vehicles, such as a small car or a large cargo truck, thereby ensuring that radiation inspection with a proper working mode of the radiation source is performed on these vehicles.

For the sensor units (110, 121, 122, 150, 160) in the embodiment of FIG. 2, the main function of them is to identify the type of the moving object and to monitor the position of the moving object in the inspection passage. Therefore, in addition to the manner in this embodiment, other manners of configuration may be designed for different sensor units based on practical requirements. For example, two sensors may be arranged upstream of the scanning region. Based on a time difference between time points at which these two sensors are triggered by the moving object, respectively, as well as a distance between these two sensors, a running speed of the moving object can be obtained. Then, based on the information such as the position of the moving object, the length of the driving cab, etc., the time necessary for the driving cab and the cargo carriage of the moving object to reach the scanning region may be calculated, respectively, and thus the time points at which the driving cab and the cargo carriage reach the scanning region can be determined and the radiation source can be activated to work at a proper working mode, i.e., emitting rays in low dose rate when the driving cab reaches the scanning region and emitting rays in high dose rate when the cargo carriage reaches the scanning region. In addition, based on the time points at which the moving object reaches or leaves different sensors, as well as the distance between different sensors, a speed of the moving object at different positions can be calculated.

The radiation source 210, such as a betatron, a race-track microtron (RTM), can emit rays in different dose rates. Take the betatron as an example. By controlling the injection time and the contract time, the flux intensity of the accelerated electron beam and hence the dose rate of the X rays emitted from the accelerator can be controlled, and thus rays in different dose rates can be obtained. The accelerator may operate in modes with the same energy and with different doses, and can be controlled in real time. A formula for X ray radiation generated by electrons impacting on a metal target is provided as follows:

$$J_x = niV^n \left( \frac{cGy}{\min} \cdot m \right)$$

In the formula, Jx is the dose of the X rays, i is the average flux intensity of the electron beam (in μA), V is the beam energy (in MV). When V is 3 MV, η is selected as 0.0271 and n is selected as 3; and when V is 8 MV, η is selected as 0.0964 and n is selected as 2.7. For the same electron flux intensity i, when V is 4 MV and 8 MV, respectively, the ray dose rate of the latter (when V is 8 MV) is about 36.1 times of that of the former (when V is 4 MV), per unit time period. It can be seen that the ray dose rate can be adjusted by adjusting either the flux intensity i or the energy V of the electron beam. Therefore, by appropriately adjusting the electron flux intensity and the radiation energy of the ray source, the requirements of safety regulations can be met when scanning is implemented with low dose rate, and a high radiation penetrating capability can be achieved when scanning is implemented with high dose rate.

The collimator 220 shields any ray emitted from the ray source but entering a space outside the scanning region, thereby reducing ray irradiation to the object under inspection. The collimator 220 according to the embodiment of the present invention is made of material with high mass thickness. In different embodiments, the collimator is provided with one or more narrow slots. The rays passing through the narrow slot(s) form a sector-shape beam of rays while other rays are shielded by the collimator.

The detector array 300 converts the ray incident into the sensitive material of the detector array to a digital signal. The detector array 300 of the present invention is a 2D array in structure that consists of a plurality of 1D arrays arranged to be closely adjacent to one another, which can improve the scanning speed of the system and reduce the dose for a single scanning.

Preferably, the sector-shape beam of rays, formed by the rays passing through the one or more narrow slots of the collimator 220, has its width equal to a width of the ray sensitive material(s) in the detector array 300 such that the beam of rays can precisely completely cover the ray sensitive region(s), thus further reducing the dose for a single scanning as far as possible. In processing, it may be made such that the width of the sector-shape beam of rays, formed by the rays passing through the collimator 220, is slightly larger than the width of the ray sensitive material of the detector array 300.

The imaging device 400 receives the digital signal from the detector array 300, which is then processed to form a radiation image or charts type data, etc., for the operation persons to check. In addition, the imaging device 400, based on the setting by the operation person, informs the radiation scanning working mode(s) of the radiation source to the control module 500. The control module 500, based on the informed working mode(s) and the signal(s) from the sensor units (110, 120, 122, 150, 160), controls the ray source 210 to perform scanning in said working mode(s).

Figure 3:
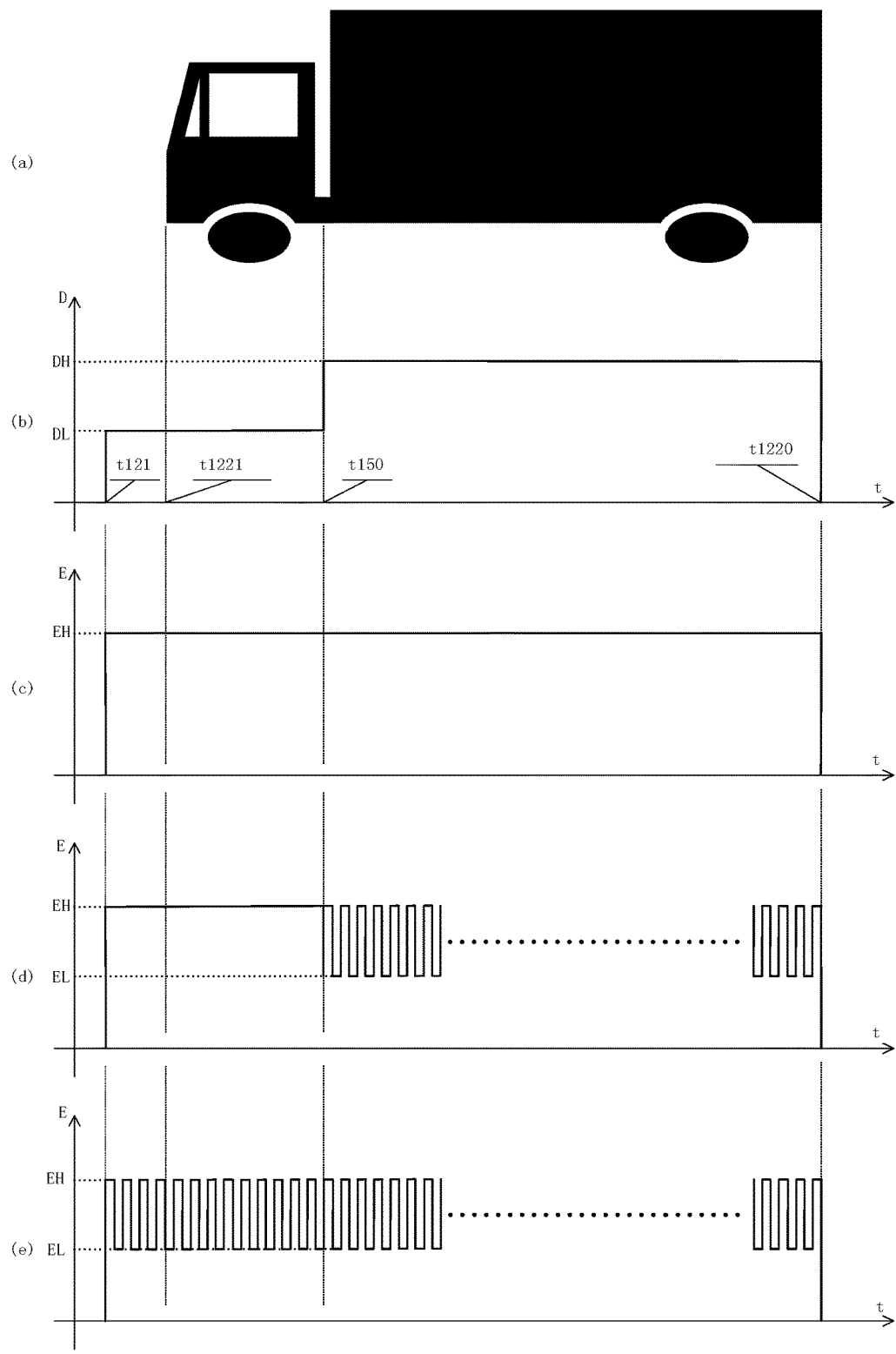
FIG. 3 is a schematic working mode diagram of radiation scanning to a cargo vehicle according to an embodiment of the present invention.

FIG. 3 shows a schematic working mode diagram of radiation scanning of the radiation source for radiation inspection on a cargo vehicle according to an embodiment of the present invention, wherein FIGS. 3(*b*)~3(*e*) show the dose rates of the rays from the ray source and the radiation energy states in different modes. It should be noted that each of the embodiments of FIG. 3~FIG. 6 will be described in conjunction with the arranging manner of the sensor units as shown in FIG. 2.

FIG. 3(*a*) is the moving object of the present embodiment, i.e. the cargo vehicle, the whole of which is to accept a scanning inspection. During scanning, the vehicle head portion (where the driver is seated) and the vehicle carriage portion (where the cargo is loaded) are handled in different ways. The vehicle head portion is scanned by rays in low dose rate to ensure that the absorbed dose in a single scanning by the person therein meets the requirements in related safety regulations (such as ANSI43.17, IEC62463); while the vehicle carriage portion is scanned by rays in high dose rate to improve the ray penetration capability. FIG. 3(*b*) shows a state of the dose rate of the rays during scanning the whole cargo vehicle. FIGS. 3(*c*), 3(*d*) and 3(*e*) are the energy state diagrams of the rays, respectively, during the operation of FIG. 3(*b*).

In FIG. 3(*b*), the time point t121 is the time point at which the vehicle reaches the sensor unit 121, the sensor unit 121 is triggered and the vehicle is to enter the scanning region. The control module 500, based on the triggered signal, controls the ray source 210 to emit rays in low dose rate (DL state). At the time point t1221, the vehicle reaches the sensor unit 122. At t150, the vehicle reaches the sensor unit 150, and at this time, the vehicle head portion (needing to be scanned in low dose rate) has passed by the scanning region while the vehicle carriage (being scanned in high dose rate) is to enter the scanning region. Thus, the control module 500, based on the signal from the sensor unit 150, controls the ray source to emit rays in high dose rate (DH state), scanning the vehicle carriage portion. At t1220, the vehicle leaves the sensor unit 122, and the control module 500 controls the ray source to immediately stop emitting rays. So far, the radiation imaging device 400 obtains a complete radiation image by scanning the vehicle head in low dose rate and scanning the vehicle carriage in high dose rate.

In FIG. 3(*c*), the ray source 210 keeps working in a high energy (EH) state during the whole scanning process. The vehicle head portion is scanned in low dose rate (DL state) while the vehicle carriage portion is scanned in high dose rate (DH state). That is, the vehicle head portion of the cargo vehicle is scanned in a mode with low dose rate and high energy while the vehicle carriage portion thereof is scanned in a mode with high dose rate and high energy.

In FIG. 3(*d*), the vehicle head portion is scanned in a mode with low dose rate and high energy while the vehicle carriage portion is scanned in a mode with high dose rate, and dual-energy in which the radiation source emits dual-energy rays, i.e. the rays being emitted in the high energy state and in the low energy state alternately. Accordingly, the rays maintaining its single energy state are called mono-energy rays, such as shown in FIG. 3(*c*). The mode shown in FIG. 3(*d*) can satisfy the requirement for scanning the vehicle head with low dose rate and can also be used to obtain the dual-energy image of the vehicle carriage portion with the relatively high penetration capability. Moreover, as the dual-energy image obtained by dual-energy scanning can be used to identify different materials, the embodiment of FIG. 3(*d*) may further be used to identify the material of the cargo carried by the vehicle.

In FIG. 3(*e*), during the whole scanning process, the ray source 210 emits dual-energy rays. That is, the vehicle head portion is scanned in a mode with low dose rate and dual-energy while the vehicle carriage portion is scanned in a mode with high dose rate and dual-energy. Thus, the requirement for scanning the vehicle head in low dose rate can be met, and the dual-energy image of the whole vehicle can also be obtained.

Figure 4:
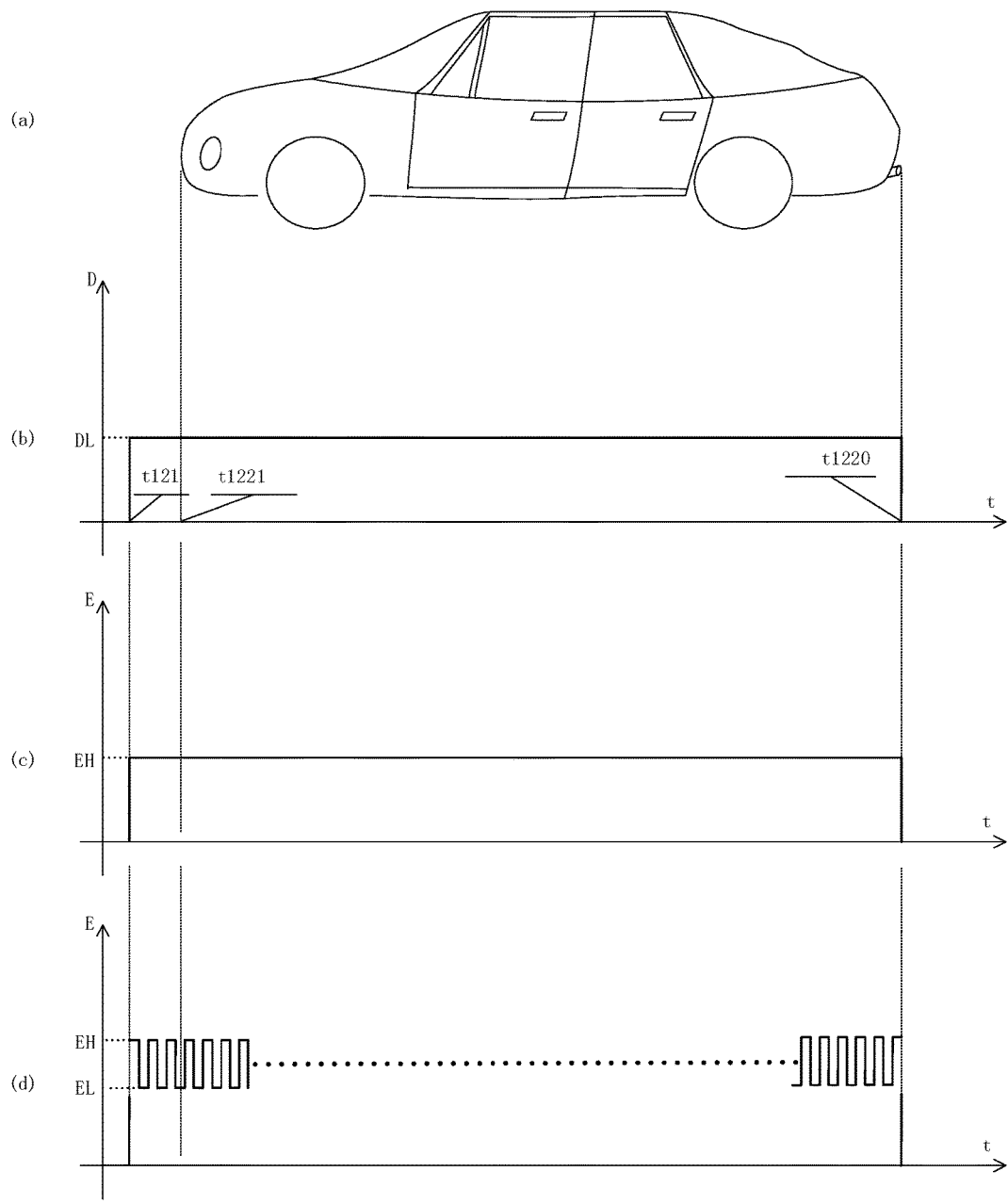
FIG. 4 is a schematic working mode diagram of radiation scanning to a passenger carrying vehicle according to an embodiment of the present invention.

FIG. 4 is a schematic working mode diagram of radiation scanning for radiation inspection on a passenger carrying vehicle according to an embodiment of the present invention, wherein FIGS. 4(*b*)~4(*d*) show the dose rates and the radiation energy states of the rays emitted from the ray source in different modes.

FIG. 4(*a*) is the moving object of the present embodiment, i.e. the person carrying vehicle, on which a scanning inspection is performed. As the person may be seated in any seat of the front row or the rear row of the vehicle, the whole vehicle is scanned by the rays in low dose rate during scanning. FIG. 4(*b*) shows a state of the dose rate of the rays during scanning the whole person carrying vehicle. FIGS. 4(*c*) and 4(*d*) are the energy state diagrams of the rays, respectively, during the operation of FIG. 4(*b*).

In FIG. 4(*b*), t121 is the time point at which the vehicle reaches the sensor unit 121, indicating that the vehicle is to enter the scanning region. The control module 500, based on the signal from the sensor unit 121, controls the ray source 210 to emit rays in low dose rate (DL state); t1221 is the time point at which the vehicle reaches the sensor unit 122; t1220 is time point at which the vehicle leaves the sensor unit 122, indicating that the vehicle leaves the scanning region. The control module 500 controls the ray source to stop emitting rays. During the whole scanning process, the ray source 210 always emits the rays in low dose rate (DL state). The sensor unit 150 will not be triggered.

In FIG. 4(*c*), the ray source 210 keeps working in a high energy (EH) state during the whole scanning process. That is, the whole vehicle is scanned in low dose rate in the high energy mode.

In FIG. 4(*d*), the ray source 210 emits the dual-energy rays during the whole scanning process. That is, the whole vehicle is scanned in a mode with low dose rate and dual-energy.

Figure 5:
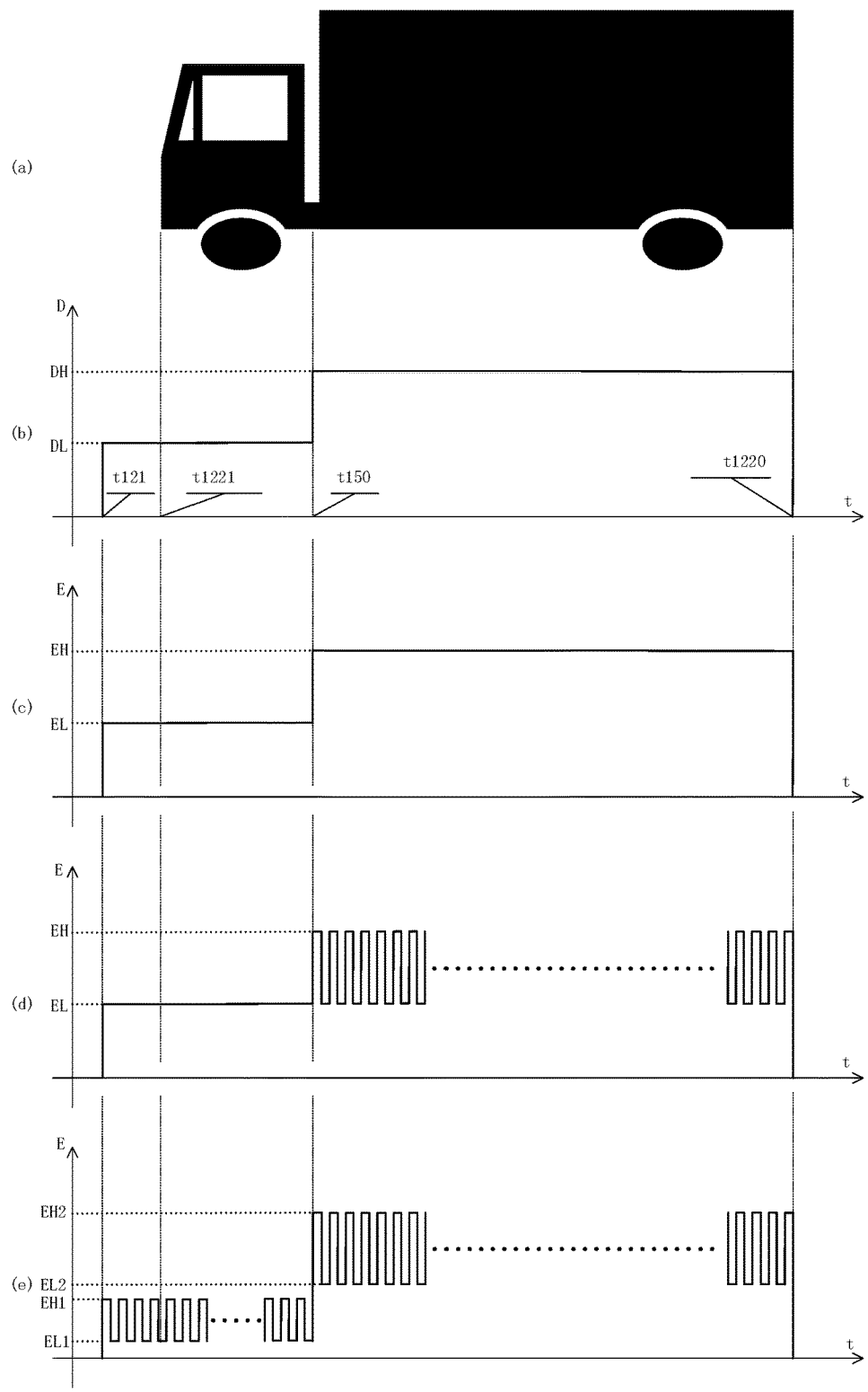
FIG. 5 is a schematic working mode diagram of radiation scanning to a cargo vehicle according to another embodiment of the present invention.

FIG. 5 shows a schematic working mode diagram of radiation scanning to a cargo vehicle according to another embodiment of the present invention.

In FIG. 5(*b*), the dose rate state of the rays from the radiation source 210 and the variation thereof are the same as those in FIG. 3(*b*).

In FIG. 5(*c*), during scanning, the ray source 210 works in the low energy (EL) state and in the high energy (EH) state. The vehicle head portion is scanned in a mode with low dose rate and low energy while the vehicle carriage portion is scanned in a mode with high dose rate and high energy.

In FIG. 5(*d*), during scanning, the ray source 210 scans the vehicle head portion in a mode with low dose rate and low energy, and scans the vehicle carriage portion in a mode with high dose rate and dual-energy, wherein in the dual-energy mode, the high energy is identified with EH and the low energy is identified with EL.

In FIG. 5(e), during scanning, the ray source 210 emits the dual-energy rays. The vehicle head portion is scanned in a mode with low dose rate and dual-energy while the vehicle carriage portion is scanned in a mode with high dose rate and dual-energy, wherein in the mode with low dose rate and dual-energy, the high energy is identified with EH1 and the low energy is identified with EL1; while in the mode with high dose rate and dual-energy mode, the high energy is identified with EH2 and the low energy is identified with EL2. Herein, EL1 and EL2 may be equal to each other or may be different from each other, and EH1 and EH2 may be equal to each other or may be different from each other, as long as the dual-energy image of the whole vehicle can be obtained. For example, during scanning as shown in FIG. 5(e), the energy states of the rays are configured such that EL1≠EL2 and EH1≠EH2. Thus, there will be four energy states of the emitted rays during such process: EL1, EL2, EH1 and EH2. If it is configured such that EL1=EL2 and EH1≠EH2, there will be three energy states during scanning: EL1(EL2), EH1 and EH2.

Figure 6:
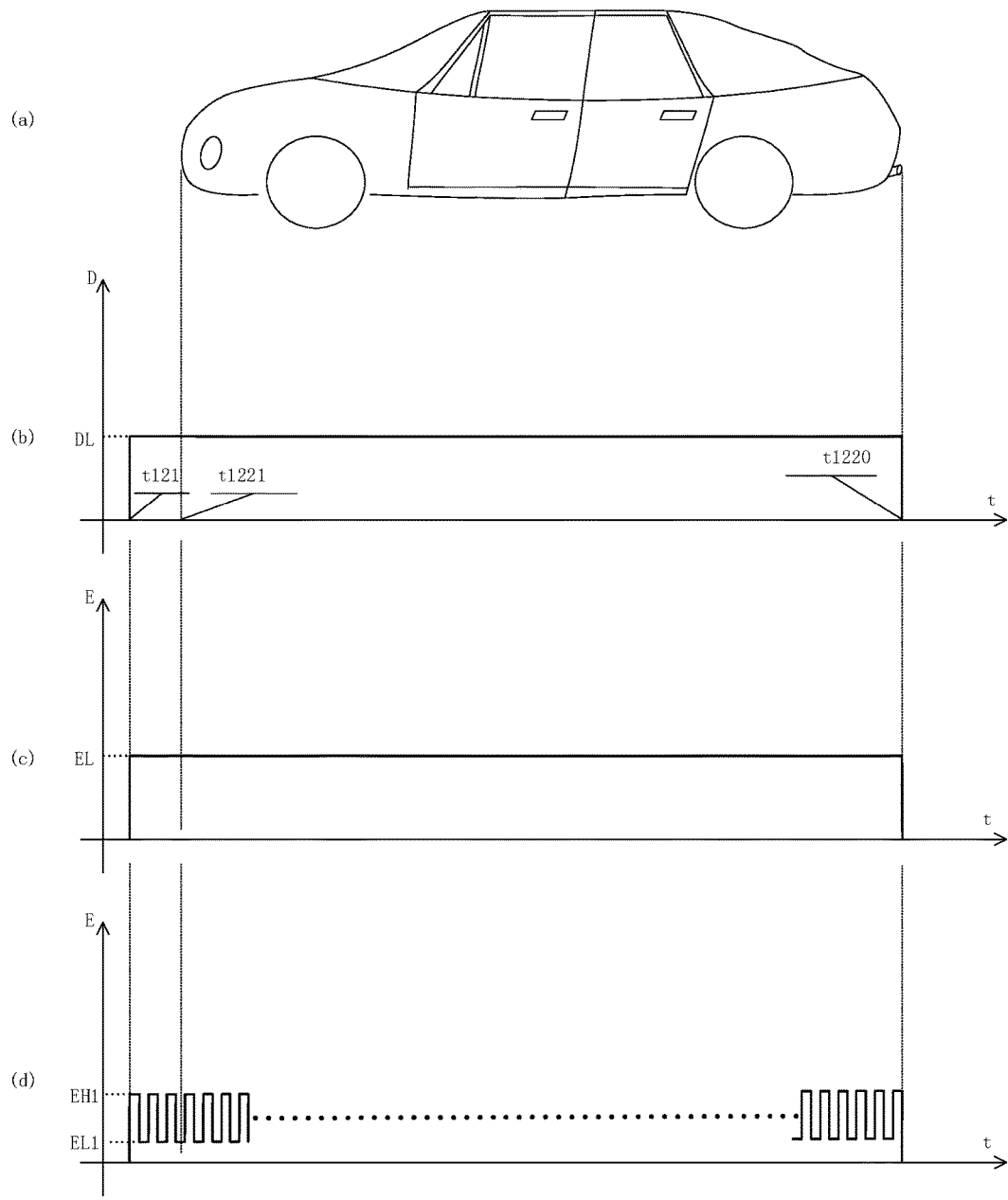
FIG. 6 is a schematic working mode diagram of radiation scanning to a passenger carrying vehicle according to another embodiment of the present invention.

FIG. 6 shows a schematic working mode diagram of radiation scanning to a passenger carrying vehicle according to another embodiment of the present invention.

In FIG. 6(b), the dose rate state of the rays from the radiation source 210 and the variation thereof is the same as those in FIG. 4(b).

In FIG. 6(c), the ray source 210 keeps working in a low energy (EL) state during the whole scanning process. That is, the whole vehicle is scanned in a mode with low dose rate and low energy.

In FIG. 6(d), the ray source 210 emits the dual-energy rays during the whole scanning process. Thus, the whole vehicle is scanned in a mode with low dose rate and dual-energy, wherein the high energy and low energy of the dual-energy rays are identified with EH1 and EL1, respectively.

In the embodiment(s) of the present invention, the average electron flux intensity concerned when the radiation source emits rays in low dose rate is 1~20% of that concerned when the radiation source emits rays in high dose rate.

In the embodiment(s) of the present invention, EH is 4~9 MV, EL is 1~6 MV.

In the embodiment(s) of the present invention, EH1 is 2~5 MV, EL1 is 1~3 MV, EH2 is 4~9 MV, EL2 is 3~6 MV.

Hereinbefore, the technical solutions of the present invention are described in detail in connection with specific embodiments. The specific embodiments as described are used to facilitate understanding of the concept of the present invention. Any derivation or variation made by those skilled in the art based on the specific embodiments of the present invention will fall into the protection scope of the present invention.

The invention claimed is:

1. A dual-mode moving object rapid radiation inspection system with a single radiation source, comprising: a radiation source, a collimator, a sensor unit, a control module, a radiation detector and a radiation imaging device, wherein, the radiation source is a betatron, the sensor unit is used for identifying a type of a moving object and monitoring a position of the moving object in an inspection passage;

the control module is used for controlling the radiation source to emit rays in a preset working mode, based on the type and the position of the moving object, the preset working mode corresponds to the type of the moving object, and the rays emitted from the radiation source in different working modes differ in dose rate, and the average electron flux intensity concerned when the radiation source emits rays in low dose rate is 1~20% of that concerned when the radiation source emits rays in high dose rate, wherein the flux intensity of an electron beam is controlled through control of injection time and contract time of the electron beam.

2. The dual-mode moving object rapid radiation inspection system with a single radiation source according to claim 1, wherein the preset working mode comprises a constant dose rate mode and a non-constant dose rate mode; in the constant dose rate mode, the dose rate of the rays is kept as a low dose rate; while in the non-constant dose rate mode, the dose rate of the rays is switched between a low dose rate and a high dose rate; wherein the low dose rate is lower than a limit specified in the radiation safety regulations while the high dose rate is higher than the limit specified in the radiation safety regulations.

3. The dual-mode moving object rapid radiation inspection system with a single radiation source according to claim 1, wherein the radiation source is used for emitting mono-energy rays and/or dual-energy rays.

4. The dual-mode moving object rapid radiation inspection system with a single radiation source according to claim 1, wherein, the sensor unit comprises a first sensor sub-unit, a second sensor sub-unit and a third sensor sub-unit, the first sensor sub-unit is located on an upstream side of a radiation inspection region in the inspection passage while the second and third sensor sub-units are located on a downstream side of the radiation inspection region; a distance between the second and third sensor sub-units is larger than or equal to L, wherein L is a maximum length of a space for containing persons among various types of moving objects.

5. The dual-mode moving object rapid radiation inspection system with a single radiation source according to claim 1, wherein the radiation detector is a 2D array detector, comprising a plurality of 1D array detectors which are arranged to be closely adjacent to one another.

6. The dual-mode moving object rapid radiation inspection system with a single radiation source according to claim 1, wherein the collimator has a plurality of narrow slots which are arranged such that the rays passing through the collimator cover the radiation detector.

7. A dual-mode moving object rapid radiation inspection method with a single radiation source, based on the dual-mode moving object rapid radiation inspection system with a single radiation source according to claim 1, wherein the method comprises:

regarding the moving object having a driving cab and a cargo carriage, when the driving cab is to enter the inspection region, performing scanning with rays in low dose rate;

when the driving cab leaves the inspection region and the cargo carriage is to enter the inspection region, performing scanning with rays in high dose rate; and after the moving object completely leaves the inspection region, stopping scanning, wherein the average electron flux intensity concerned when the radiation source emits rays in low dose rate is 1~20% of that concerned when the radiation source emits rays in high dose rate, wherein the flux intensity of an electron beam is controlled through control of injection time and contract time of the electron beam.

8. The dual-mode moving object rapid radiation inspection method with a single radiation source according to claim 7, wherein during a single radiation inspection, the rays in low dose rate are mono-energy rays or dual-energy rays, and the rays in high dose rate are mono-energy rays or dual-energy rays.

9. The dual-mode moving object rapid radiation inspection method with a single radiation source according to claim 8, wherein,
when the rays in low dose rate are the mono-energy rays, the radiation energy of the rays is 1~9 Mev; and
when the rays in low dose rate are the dual-energy rays, the high and low energy states of the rays are selected from one of the following three items: ① a low energy of 1~6 MeV and a high energy of 4~9 MeV; ② a low energy of 1~3 MeV and a high energy of 2~5 MeV; ③ a low energy of 3~6 MeV and a high energy of 4~9 MeV; wherein the high energy of the dual-energy rays is always higher than the low energy thereof.

10. The dual-mode moving object rapid radiation inspection method with a single radiation source according to claim 8, wherein,
when the rays in high dose rate are the mono-energy rays, the radiation energy of the rays is 4~9 Mev; and
when the rays in high dose rate are the dual-energy rays, the high and low energy states of the rays are selected from one of the following two items: ① a low energy of 1~6 MeV and a high energy of 4~9 MeV; ② a low energy of 3~6 MeV and a high energy of 4~9 MeV; wherein the high energy of the dual-energy rays is always higher than the low energy thereof.

11. The dual-mode moving object rapid radiation inspection method with a single radiation source according to claim 8, wherein when the rays in low dose rate and the rays in high dose rate are both the dual-energy rays, there are at least three energy states during a single radiation inspection.

12. A dual-mode moving object rapid radiation inspection method with a single radiation source, based on the dual-mode moving object rapid radiation inspection system with a single radiation source according to claim 1, wherein the method comprises:
regarding the moving object having all its cab/carriage(s) for containing persons, when the moving object is to enter the inspection region, performing scanning with rays in low dose rate;
after the moving object completely leaves the inspection region, stopping scanning,
wherein the flux intensity of an electron beam is controlled through control of injection time and contract time of the electron beam.

13. The dual-mode moving object rapid radiation inspection method with a single radiation source according to claim 12, wherein
during a single radiation inspection, the rays in low dose rate are mono-energy rays or dual-energy rays.

14. The dual-mode moving object rapid radiation inspection method with a single radiation source according to claim 13, wherein,
when the rays in low dose rate are the mono-energy rays, the radiation energy of the rays is 1~9 Mev; and
when the rays in low dose rate are the dual-energy rays, the high and low energy states of the rays are selected from one of the following two items: ① a low energy of 1~6 MeV and a high energy of 4~9 MeV; ② a low energy of 1~3 MeV and a high energy of 2~5 MeV; wherein the high energy of the dual-energy rays is always higher than the low energy thereof.

* * * * *